(12) United States Patent
Tu et al.

(10) Patent No.: US 9,898,142 B2
(45) Date of Patent: Feb. 20, 2018

(54) TOUCH DETECTION ON A CURVED SURFACE

(71) Applicant: Ford Global Technologies, LLC, Dearborn, MI (US)

(72) Inventors: Hongen Tu, Warren, MI (US); John Robert Van Wiemeersch, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 64 days.

(21) Appl. No.: 15/089,463

(22) Filed: Apr. 1, 2016

(65) Prior Publication Data

US 2017/0285791 A1  Oct. 5, 2017

(51) Int. Cl.
*G06F 3/042* (2006.01)
*G06F 3/041* (2006.01)

(52) U.S. Cl.
CPC ............ *G06F 3/042* (2013.01); *G06F 3/0412* (2013.01)

(58) Field of Classification Search
None
See application file for complete search history.

(56) References Cited

U.S. PATENT DOCUMENTS

| 6,305,123 | B1 | 10/2001 | Davies et al. |
| 7,067,794 | B2 | 6/2006 | Le Gallo et al. |
| 7,242,388 | B2 | 7/2007 | Lieberman et al. |
| 7,248,151 | B2 | 7/2007 | McCall |
| 8,339,379 | B2 | 12/2012 | Goertz et al. |
| 8,400,406 | B1 | 3/2013 | Kurtz et al. |
| 8,976,157 | B2 | 3/2015 | Hwangt |
| 8,994,495 | B2 | 3/2015 | Dassanayake et al. |
| 9,146,641 | B2 | 9/2015 | Lee |
| 2005/0276449 | A1 | 12/2005 | Pedemas et al. |
| 2009/0153151 | A1* | 6/2009 | Cho ..................... H03K 17/955 324/681 |
| 2009/0189878 | A1 | 7/2009 | Goertz et al. |
| 2011/0021272 | A1* | 1/2011 | Grant ..................... A63F 13/10 463/30 |
| 2011/0163998 | A1 | 7/2011 | Goertz et al. |
| 2014/0267171 | A1* | 9/2014 | Kim ..................... G06F 3/0421 345/175 |
| 2015/0363348 | A1* | 12/2015 | Deratany ............. G06F 1/1632 710/304 |
| 2016/0085373 | A1* | 3/2016 | Chang .................. G06F 3/0421 345/175 |

FOREIGN PATENT DOCUMENTS

| AU | 2002950909 | 9/2002 |
| CN | 102103440 A | 6/2011 |
| CN | 103696649 A | 4/2014 |
| EP | 0958975 A1 | 11/1999 |
| EP | 2550584 A1 | 1/2013 |
| EP | 2565756 A2 | 3/2013 |
| KR | 20070082958 A | 8/2007 |
| KR | 100829172 B1 | 5/2008 |

* cited by examiner

Primary Examiner — Duane N Taylor, Jr.
(74) Attorney, Agent, or Firm — Frank A. MacKenzie; Bejin Bieneman PLC

(57) ABSTRACT

A system includes a curved window and a light energy emitter arranged exterior to the curved window. The system includes a light energy receiver arranged exterior to the curved window and arranged to detect light energy emitted by the light energy emitter. The light energy passes over a touchpad provided on the curved window. A touch on the touchpad may be detected by the system.

18 Claims, 9 Drawing Sheets

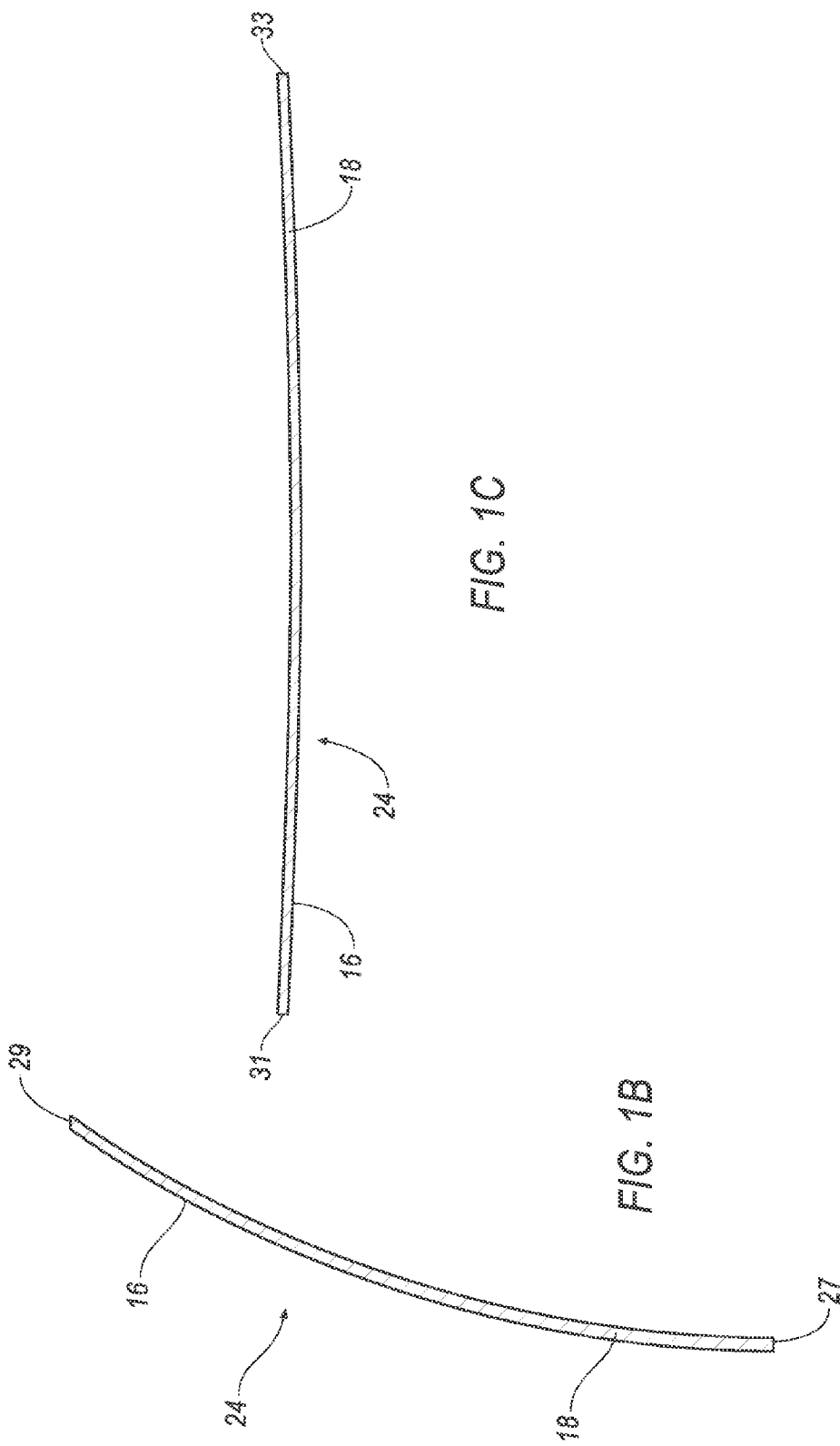

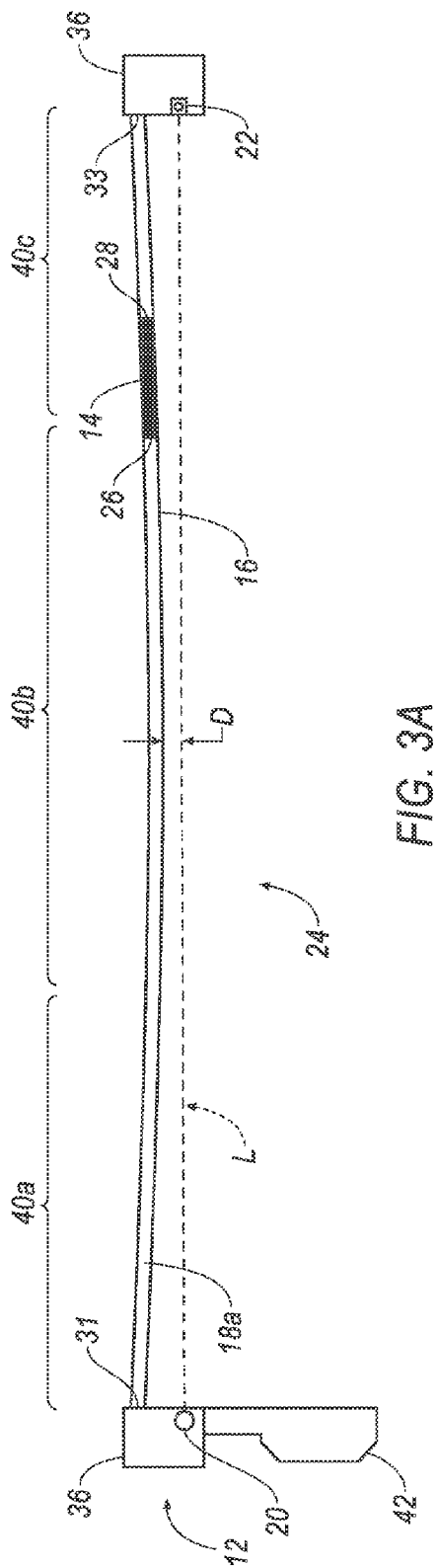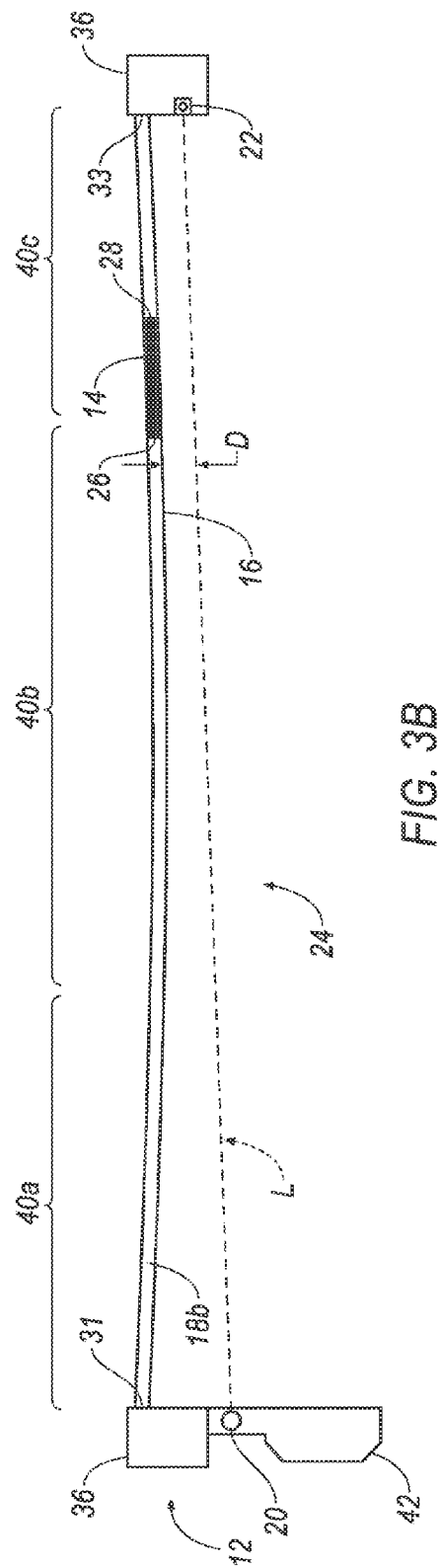
FIG. 3A
FIG. 3B

TOUCH DETECTION ON A CURVED SURFACE

BACKGROUND

Placing a keypad or the like on an exterior surface of a vehicle can be a good way to receive user input to allow access to the vehicle. Vehicle windows cover a significant portion of a vehicle's exterior surface, and typically are located at a height convenient for a user to access. However, mechanisms for accepting input on a window are lacking for a number of reasons. First, there are specific areas windows must be kept clear during operation of a vehicle per government regulations, meaning that a conveniently placed physical touchpad, which would require some physical structure to be physically attached to a window, would violate clear area requirements. Further, due to vehicle windows (at least side windows) being moveable, there are durability and cost challenges with interfacing electronics to a window-mounted touchpad. Additionally, the fact that vehicle windows are curved presents further cost challenges to implementing a non-physical, i.e., virtual, input mechanism on a vehicle window.

BRIEF DESCRIPTION OF THE DRAWINGS

FIG. 1B is a side view of the curved window of FIG. 1A.

FIG. 1C is a top view of the curved window of FIG. 1A.

FIGS. 3A-3B are top views of the system of FIG. 1A, each including a curved window having arcs with different curvatures.

DETAILED DESCRIPTION

Introduction

User input to a touchpad or the like can be detected on a window surface. Advantageously, the touchpad requires no electronic or other hardware connection to a surface, e.g., a window surface, on which it is provided. Instead, a touch overlay system that emits and detects light energy, e.g., infrared (IR), ultraviolet (UV), etc., as disclosed herein can be used to obtain user input. For example, a user's finger can interrupt and thereby deflect, projected IR beams of light energy, whereupon a user's input, in this example touching a key of a touchpad, can be detected.

A touchpad area can be specified for a vehicle window. Advantageously, the touchpad area can be small relative to a surface area of the vehicle window; a detection zone of a size typical of a keypad or other data entry pad can be provided for the touchpad area. Thus, in one implementation, an IR emitter source and a relatively small IR receiver bank can be used to detect finger positions on the touchpad. The IR emitter source and the corresponding IR receiver bank can advantageously reduce touch overlay system complexity and cost. In another implementation, an IR receiver and a relatively small bank of IR emitters may be cycled one at a time to detect the finger positions.

Because the touch overlay system works on the principle of line-of-sight (LoS), i.e., the IR receivers can only detect the IR light energy emitted along a line connecting the pair, a touchpad on a curved surface such as a vehicle window require careful placement of the IR emitter and receivers as disclosed herein.

The touch overlay system includes a processor programmed to detect deflected infrared light associated with a touch on the touchpad. The processor can be further programmed to output a control signal, for example, to a haptic device to notify a user, e.g., via a vibration on a window, when the touch is registered by the processor. The processor can also provide the control signal to a vehicle entertainment system or a dedicated speaker for the keypad to provide audio feedback via a radio speaker when the touch is registered. Yet further, the touch overlay system can be implemented to detect obstructions when a window is open or when the window is moving to a closed position, in addition or as an alternative to implementing the system to detect touches to a touchpad on the window. Further, it is possible to detect a consistent or fixed obstruction which may be ice or snow and the user could be notified via their phone or an alert message on an in-vehicle display of the obstructions. Such notification could be provided assuming the user entered the vehicle using a key or a telematics-based unlock command such as is known. Further, when the vehicle is locked and a security system is armed with windows down, the disclosed system could detect someone reaching into the cabin and provide the control signal in efforts to sound an alarm or send an alert message.

System Overview

Figure 1A:
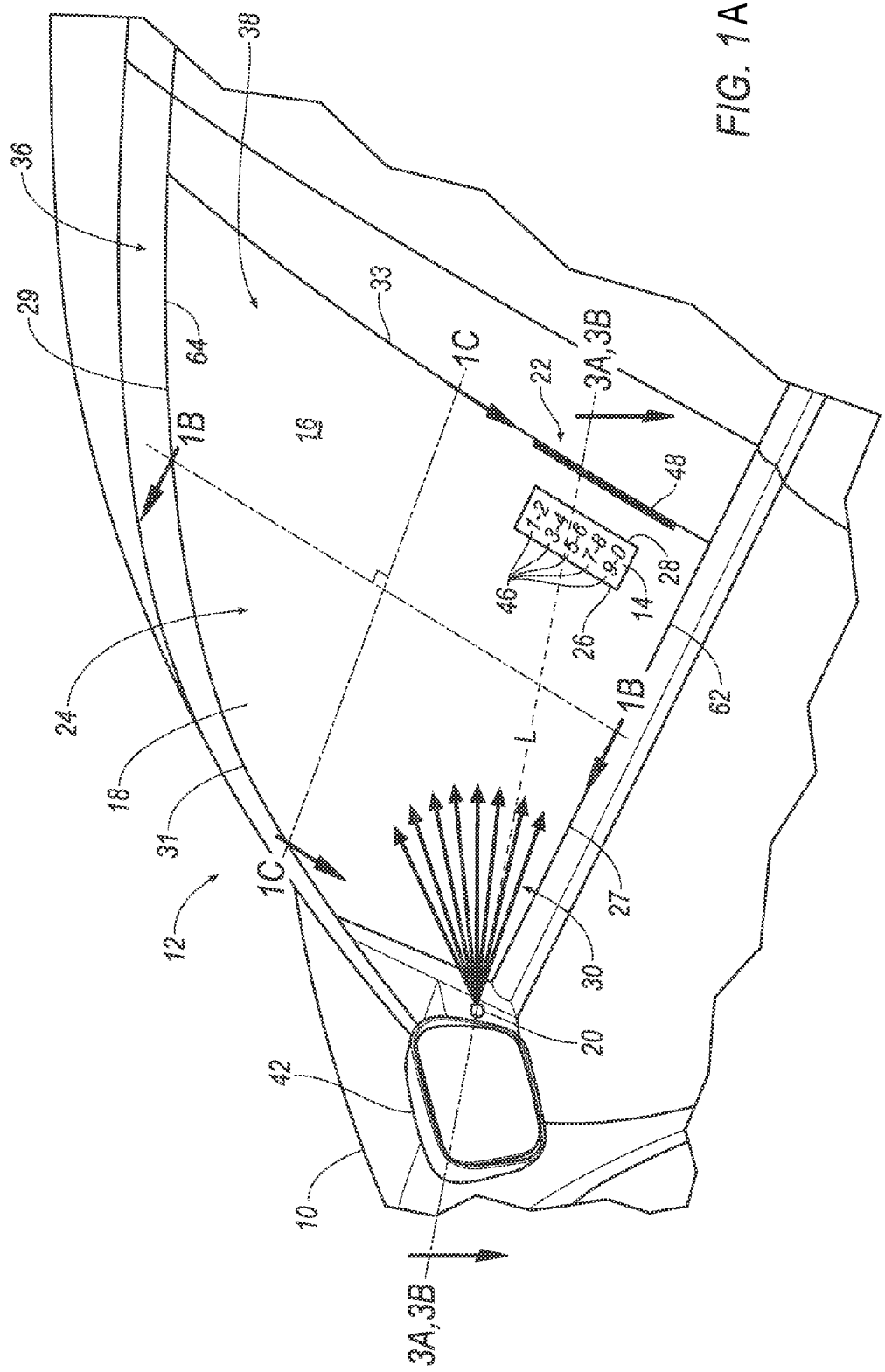
FIG. 1A is a perspective view of an example vehicle system for detecting a touch on a curved window.
Figure 2A:
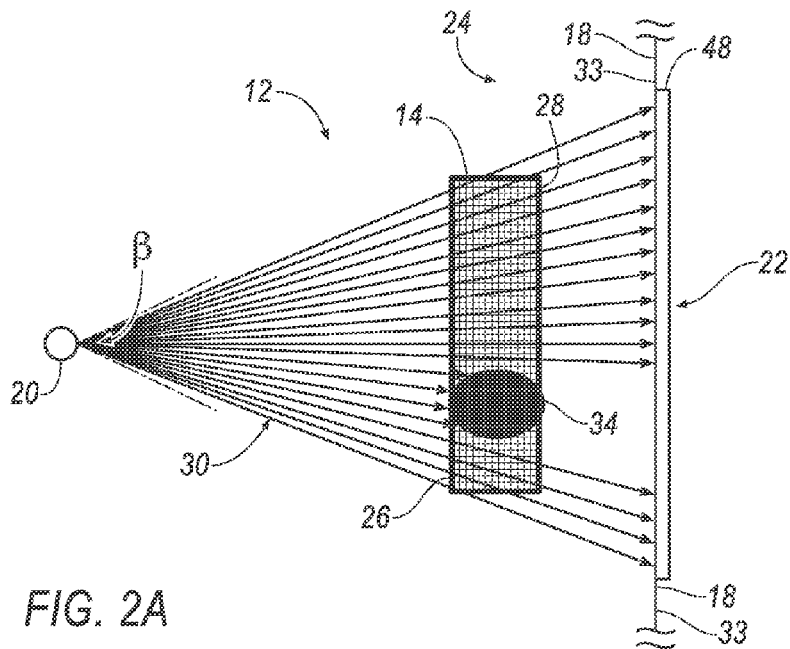
FIG. 2A is a front view of an exemplary portion of the system of FIG. 1A, including an example touchpad and an object deflecting infrared light energy.
Figure 2B:
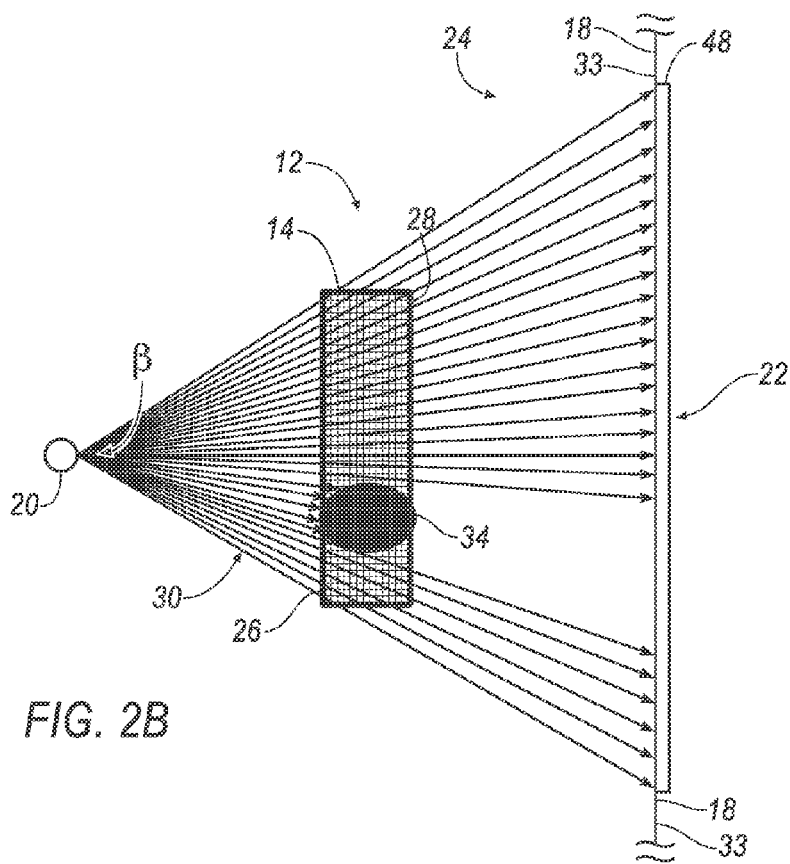
FIG. 2B is a front view of another exemplary portion of the system of FIG. 1A, including an example touchpad and an object deflecting infrared light energy.

As illustrated in FIG. 1A, a vehicle 10 (shown partially) includes an exemplary system 12 for detecting a user touch to a touchpad 14 that is disposed on a curved surface 16. The exemplary system 12 includes, an infrared light (IR) emitter 20, a least one IR receiver 22, a curved window 18, and the touchpad 14 disposed on the curved window 18. The IR emitter 20 and IR receiver 22 may be arranged on an exterior side 24 of the curved window 18 and positioned on a first side 26 and a second side 28 of the touchpad 14 respectively. Moreover, the IR emitter 20 and the IR receiver 22 may be arranged with respect to each other such that IR light energy 30 transmitted from the IR emitter 20 passes over the touchpad 14 along a line L between the IR emitter 20 and the IR receiver 22. As shown in FIGS. 2A-2B, an object 34, e.g., a user's finger, placed on the touchpad 14 can deflect the IR light energy 30 such that the IR receiver 22 ceases to receive the IR light energy 30, at least for a period of time during which the object 34 is positioned to deflect the IR energy 30. Thus, the exemplary system 12 may detect the object 34 due to the absence of the IR light energy 30 at the IR receiver 22.

In the exemplary system 12, a means for emitting IR light energy 30 is provided by the IR emitter 20. The IR emitter 20 may include electronic components such as are known that, when combined, provide a source of light energy in the IR spectrum. For example, the IR emitter 20 is a source of IR light energy 30 that may be directed at the IR receiver 22. When properly placed, the IR emitter 20 transmits the IR light energy 30, which advances along the line L to be incident upon the IR receiver 22. The IR emitter 20 may be, for example, an IR light emitting diode (LED) such as is known. The IR emitter 20 may be configured to emit IR light energy 30 within a narrow angular sector (3, as shown in FIGS. 2A-2B. The IR emitter 20 may include electrical components that may be connected to a processor 100 in a known manner to selectively activate the IR emitter 20, and to selectively adjust the intensity of the IR light energy 30. The IR emitter 20 may be a source of light energy light spectrums other than IR, e.g., UV, etc.

A means for detecting IR light energy 30 may be provided by the IR receiver 22. The IR receiver 22 may include electronic components such as are known that, when combined, receives IR light energy 30 and converts the IR light energy 30 into electrical energy 56. The IR receiver 22 may be, for example, a phototransistor, a light dependent resistor (LDR), etc., that receives IR light energy 30 and converts it to electrical energy 56 that can be made available to an electrical circuit 50, as described below. The IR receiver 22 may be positioned to receive the IR light energy 30 from the IR emitter 20 along the line L between the IR emitter 20 and IR receiver 22. As illustrated in FIGS. 2A-2B, when the object 34 deflects or blocks the IR light energy 30 transmitted to the IR receiver 22, the corresponding converted electrical energy 56 is reduced which may be exploited by the electrical circuit 50. A distance between the IR emitter 20 and the IR receiver 22 may be specified according to a predicted IR light energy 30 and/or electrical energy 56 as seen by the receiver 22, as discussed further below. The IR receiver 22 may receive light energy light spectrums other than IR, e.g., UV, etc.

Arrangement of System

The curved surface 16 of the window 18 typically includes more than one curvature, i.e., rate at which the surface 16 deviates from a line. Further, the surface 16 may be curved with respect to more than one axis, e.g., the surface 16 may be curved in a vertical direction and also in a horizontal direction. Such a design, as is known, is used, e.g., to improve aerodynamic characteristics and outward appearance of the vehicle 10. Alternatively, the surface 16 may be any suitable curved surface 16 where touch detection is desired, e.g., locked room, home entry, etc.

For example, as seen in FIG. 1B, a side view of the window 18, the surface 16 is typically curved inwardly and upwardly, i.e., in a vertical direction, from a bottom side 27 toward a topside 29 of the window 18. This curvature is described as inward because the surface 16 is typically an exterior surface, and therefore the curvature of the window 18 from the bottom side 27 to the top side 29 is toward a vehicle 10 interior.

Additionally, as illustrated in FIG. 1C, which is a top view of the window 18, the window 18 has a front side 31 and a rear side 33 such that the surface curves inwardly toward the vehicle 10 interior with respect to a horizontal direction. As discussed below, the IR emitter 20, IR receiver 22 and touchpad 14 must be positioned such that IR light energy 30 is unobstructed when transmitted by the IR emitter 20 to the receiver 22 as the IR light energy 30 passes over the touchpad 14. Therefore, the IR emitter 20 and IR receiver 22 are positioned to accommodate the overall shape of the curved surface 16 and the position of the touchpad 14.

As shown in FIG. 1A, the touchpad 14 may be positioned in a quadrant of the window 18 closer to the bottom side 27 and rear side 33 than to the other sides 29, 31. The line L is defined by respective points in the IR emitter 20 and the IR receiver 22 such that the line passes over the touchpad 14 (i.e., the line L does not intersect or touch the touchpad 14, but a line perpendicular to the line L would intersect the touchpad 14), as shown in FIG. 1A. Line L can be any line between the IR emitter 20 and the IR receiver 22 passing over any portion of the touchpad 14. Further, the line L is a line along which an unobstructed beam of IR light could be moving. A plurality of IR receivers 22 may be aligned along a first IR detector bank 48, as shown in FIGS. 1, 2A, 2B, 5 and 7.

Reference is now made to FIGS. 2A and 2B, which are front views of first and second examples of portions of the system of FIG. 1A. In both examples, the first IR detector bank 48 of IR receivers 22 is mounted on a vehicle pillar as close to the curved window 18 rear edge 33 as is practicable. In FIG. 2A, it can be seen that the touchpad 14 is located on the curved window 18 surface 16 closer to the rear edge 33 than in the example of FIG. 2B. FIGS. 2A and 2B thus illustrate the point that, as the touchpad 14 is moved away from the first IR detector bank 48 toward the IR emitter 20, a length of the first bank 48 increases. As will be understood, a larger (e.g., longer) bank 48 increases costs and otherwise decreases the IR receiver 22 packaging efficiency, e.g., in terms of weight, installation ability, etc. The IR emitter 20 is typically positioned on the exterior side 24 of the curved window 18 to accommodate the curved surface 16, touchpad 14 and IR receivers 22, as further set forth below.

FIGS. 3A and 3B show sectional views of example curved windows 18a and 18b respectively, taken along a cut CC shown in FIG. 1A. The curved windows 18a and 18b can define one or, as is typical and as is shown in these examples, more arcs 40. An arc 40 can be defined as a portion of a circle. Each arc 40 may have a different curvature, i.e., rate at which the arc 40 deviates from the line L, i.e., difference in amounts that the arc 40 deviates from the line L over a same length of the line L or, looked at a different way, be defined by radii of different lengths. A first arc 40 with a first radius will have a lesser curvature than a second arc 40 with a second radius when the first radius is greater than the second radius.

FIG. 3A shows the curved window 18a with three arcs 40, e.g., arc 40a, arc 40b and arc 40c. The curvature of arc 40a, for example, is greater than arcs 40b or 40c, i.e., arc 40a deviates from the line L more than arcs 40b or 40c. Similarly, FIG. 3B shows the curved window 18b with three arcs 40d, 40e, and 40f. The curvature of arc 40d, for example, is greater than arcs 40e or 40f. Further, arc 40d has a greater curvature than arc 40a.

A distance D is a shortest distance between the line L and the curved surface 16. If the critical distance D were zero, the line L would be tangent to the surface 16. The distance D is typically greater than zero so that the IR light energy 30 transmissions from the IR emitter 20 to the IR receiver 22 along the line L will be unobstructed. The distance D may thus account for environmental elements 44, e.g., rain, fog, ice, snow, dirt, dust, etc., that may build up on the curved window 18. In other words, the distance D is established to allow for the unobstructed IR light energy 30 transmissions from the IR emitter 20 to the IR receiver 22 along the line L when environmental elements 44 are present on the curved window 18.

As shown in FIGS. 1, 3A-3B and 7, the exemplary system 12 includes a side view mirror housing 42 and a door frame 36 defining an opening 38 that receives the curved window 18. The side view mirror housing 42 is coupled to the door frame 36. The positioning of the IR emitter 20 and IR receiver 22 may depend on the curvature of the one or more arcs 40. For example, the curvature of arc 40d is greater for the curved window 18b in FIG. 3B than arc 40a in FIG. 3A, i.e., the arc 40*d* deviates from the line L more than the arc 40*a*. As shown in FIG. 3A, the IR emitter 20 and IR receiver 22 are positioned in the door frame 36. The increased curvature of arc 40*d* may require that the IR emitter 20 be moved outward from the curved window 18 and placed in the side view mirror housing 42 to maintain the unobstructed IR light energy 30 transmission from the IR emitter 20 to the IR receiver 22 along the line L, i.e., a critical distance D greater than zero, as shown in FIG. 3B.

The touchpad 14 typically includes indicia 46 provided on the curved window 18, as shown in FIG. 1A. A means for providing the indicia 46 on the curved window 18 may be provided, for instance, by permanently printing the indicia 46 on the curved window 18, e.g., semi-translucent permanent indicia. Alternatively, the indicia 46 may be etched onto the exterior side 24 or an inner surface of the curved window 18. In another example, the indicia 46 may be formed onto the curved window 18 using UV fluorescent dye that is nearly invisible to a human eye until exposed to UV light. A UV light emitting device mounted to the vehicle 10 may be used to illuminate the indicia 46 thereby causing the indicia 46 to become readily visible by the human eye. In yet another instance, the indicia 46 may be projected onto the curved window 18 forming a virtual touchpad by, e.g., a laser projector mounted to the vehicle 10. As a number of indicia 46 to be deciphered increases, the number of IR receivers 22 needed to discern the indicia 46 may increase. In yet another example, the target touchpad 14 may be a label or sticker on the exterior side 24 or the inner surface of the window 18. Additionally, the touchpad 14 may be an image embedded on an inner layer of window 18, e.g., a laminated glass window.

Figure 4:
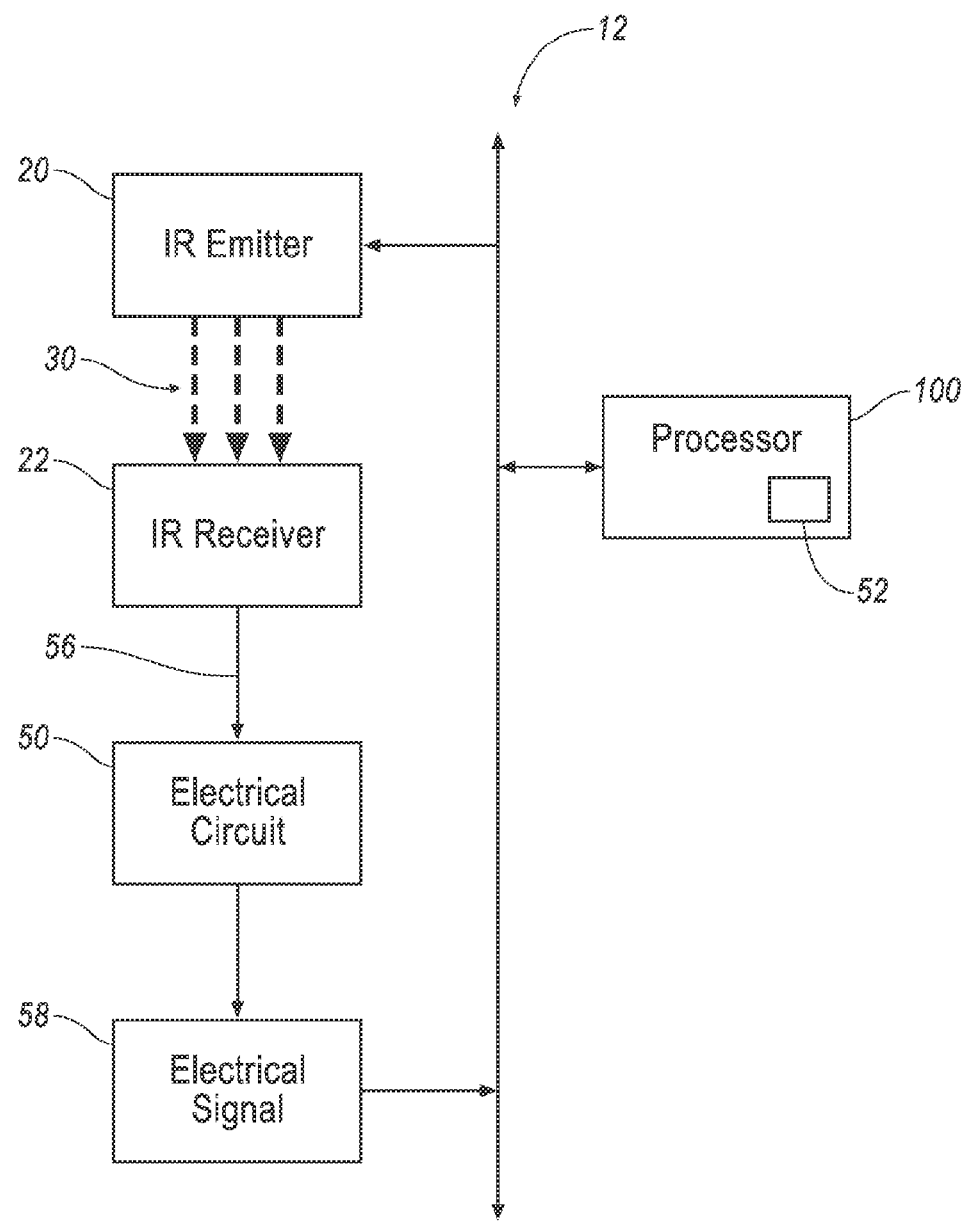
FIG. 4 is a block diagram of the system of FIG. 1A.

Referring now to FIG. 4, the exemplary system 12 may also include the electrical circuit 50, a memory 52, and the processor 100. Some or all of these components may be in communication with each other over a vehicle 10 wired and/or wireless network, such as a Controller Area Network (CAN) bus, BLUETOOTH, Wi-Fi, Ethernet, or the like. As set forth above, the IR emitter 20 and IR receiver 22 communicate via IR light energy 30.

The electrical circuit 50 may include electronic components such as are known that, when combined, accepts as input the electrical energy 56 from the IR receiver 22 and outputs an electrical signal 58. A magnitude 60 of the electrical signal 58, e.g., the low-to-high voltage differential, may be proportional to the IR light energy 30 received by the IR receiver 22. The electrical circuit 50 may include electrical components necessary to process and provide the electrical signal 58 to the processor 100, e.g., in a known manner such as performing analog to digital conversion. Each IR receiver 22 may be coupled to a circuit 50 to provide a signal 58 representing the receiver 22 to the processor 100.

The memory 52 may include any number of electronic devices that can store data. For instance, the memory 52 may store magnitudes 60 of the electrical signals 58 provided by the IR receivers 22. For example, the memory 52 may store data, e.g., in a lookup table or the like, to be used by the processor 100 to compare magnitudes 60 of the electrical signals 58 to stored values that may represent the unobstructed IR light energy 30 received by the IR receiver 22 when no object 34 is present, e.g., user's finger, curved window, etc., between the IR emitter 20 and the IR receiver 22.

The processor 100 may be programmed to activate the IR emitter 20 to transmit IR light energy 30. The processor 100 may be programmed to receive the magnitudes 60 of the electrical signals 58 corresponding to the respective IR receivers 22. The processor 100 may be programmed to access a stored reference light intensity value from the memory 52 and compare it to the magnitude 60 of the electrical signal 58 and output a touch indicator signal, i.e., a binary value indicating whether a touchpad 14 key was touched, based on the difference between the magnitude 60 and the stored reference value. There may be one electrical circuit 50, and the processor 100 may be programmed to output a multiplexing signal that electrically connects the electrical circuit 50 to a specific IR receiver 22 in order to receive the magnitude 60 of the electrical signal 58 for the specific IR receiver 22.

System Operation

Figure 5:
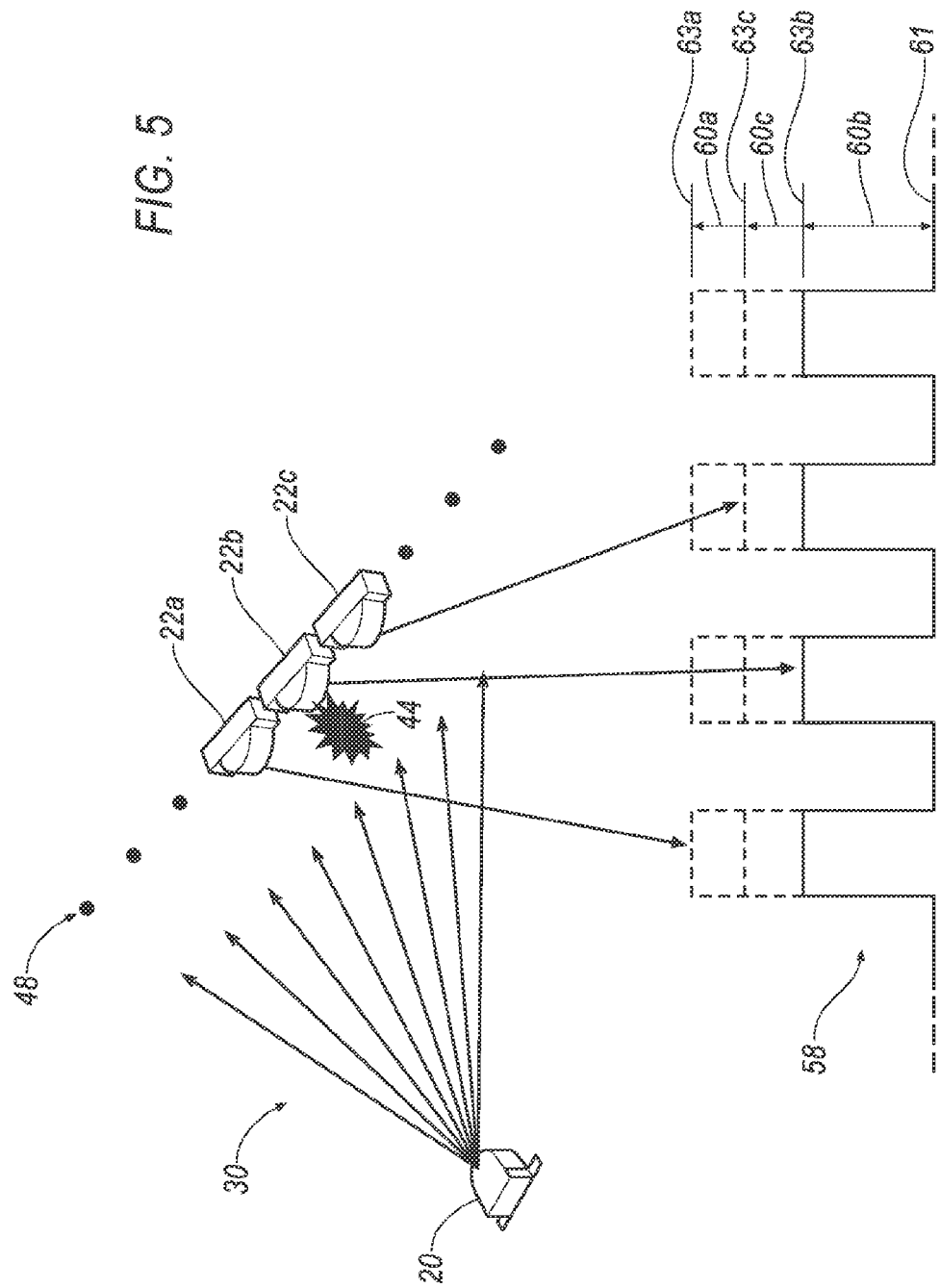
FIG. 5 illustrates an output waveform of various magnitudes from an infrared receiver.

FIG. 5 shows the IR emitter 20 transmitting IR light energy 30. The processor 100 may be programmed activate the IR emitter 20 by outputting an emitter output signal to turn the IR emitter 20 on without modulation, i.e., the IR emitter 20 is turned on with a 100% duty cycle. The emitter output signal may be pulse width modulated, i.e., the emitter output signal may turn the IR emitter 20 on and off at a particular high frequency rate and varying duty cycle. Pulse width modulation may be employed to, e.g., reduce the IR emitter 20 current draw. The IR receiver 22 may receive the modulated or unmodulated IR light energy 30 output from the IR emitter 20.

For the case of modulated IR light energy 30, the magnitudes 60, e.g., 60*a*-60*c* of the electrical signals 58 corresponding to the IR receivers 22, e.g., 22*a*-22*c*, respectfully, are shown in FIG. 5. For example, IR receiver 22*a* may receive unobstructed IR light energy 30, which corresponds to the electrical signal 58 having a magnitude 60*a*. In a similar fashion, IR receiver 22*c* may receive unobstructed IR light energy 30, which corresponds to the electrical signal 58 having a magnitude 60*c*. The magnitude 60*a* could be greater than magnitude 60*c* due to IR receiver 22*a* being at a closer distance to the IR emitter 20 than IR receiver 22*c*. IR receiver 22*b* may receive IR light energy 30, which corresponds to the electrical signal 58 having a magnitude 60*b*. The magnitude 60*b* could be smaller than either magnitude 60*a* or 60*c*, which may be due to environmental elements 44 that have attached to the IR receiver 22*b* potentially blocking some of the IR light energy 30 from the IR emitter 20. The pulse width modulated electrical signal 58 corresponding to modulated IR light energy 30 may be transformed to an average electrical signal 58 by the electrical circuit 50 where the magnitude 60 of the average electrical signal 58 is proportional to the duty cycle. For the case of unmodulated IR light energy 30, the electrical signal 58 pulses shown in FIG. 5 would be replaced with constant, non-pulsed magnitudes 60*a*, 60*b* and 60*c* respectively. The processor 100 may be programmed to receive the electrical signal 58 from each IR receiver 22 at a frequency sufficiently high enough to capture the touch on the touchpad 14.

With reference to FIG. 5, the magnitudes 60, as set forth above, assume an off-emitter measurement 61 of zero. The off-emitter measurement 61 is the electrical signal 58 value received by the processor 100 when the IR emitter 20 is off. Therefore, the magnitudes 60 are simply the on-emitter measurements 63, i.e., the electrical signal 58 values received by the processor 100 when the IR emitter 20 is on. Environmental noise factors, e.g., infrared radiation from ambient light, cause the off-emitter measurement 61 to be greater than zero, which may be eliminated from the magnitudes 60 by subtracting out the off-emitter measurement 61. For example, the magnitudes 60 are calculated by subtracting the off-emitter voltage 61 from the on-emitter voltages 63. Specifically, the processor 100 determines magnitude 60a by subtracting the off-emitter measurement 61 from the on-emitter measurement 63a. Magnitudes 60b and 60c are calculated in the same fashion. To increase the accuracy of the magnitudes 60 and eliminate environmental noise, the processor 100 may receive the off-emitter measurement 61 synchronous with the on-emitter measurements 63. The magnitudes 60 decrease when the IR light energy 30 is obstructed, i.e., deflected by a user's finger, which can be detected as described below.

Figure 7:
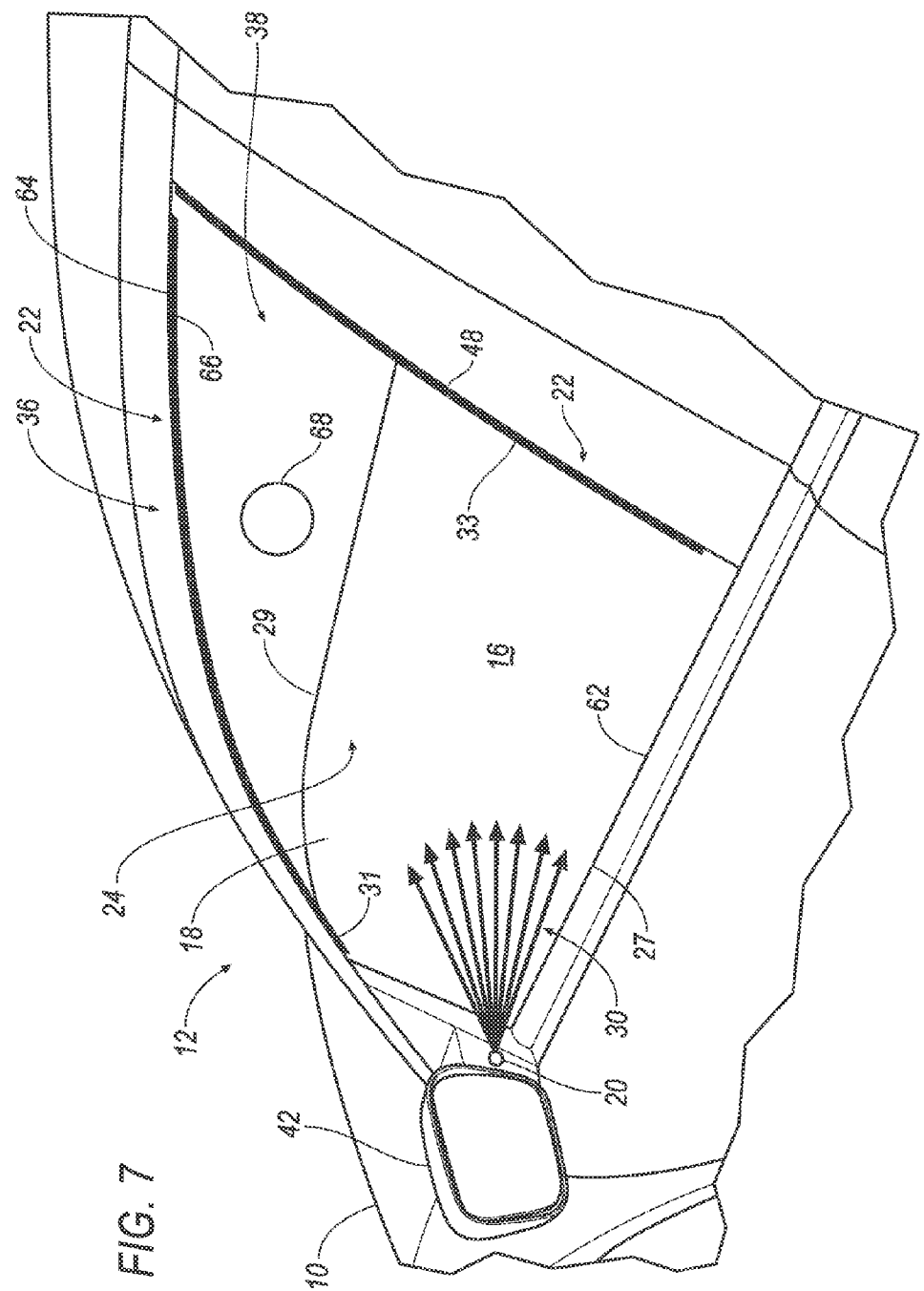
FIG. 7 is a perspective view of the system of FIG. 1A with the curved window of the system in an open position and an obstacle in an opening.

As shown in FIGS. 1 and 7 and as set forth above, the door frame 36 defines the opening 38 for receiving the curved window 18, and the curved window 18 is moveable along the opening 38 from a closed position, as shown in FIG. 1A, to an open position, as shown in FIG. 7. The open position of the curved window 18 may extend to a bottom 62 of the door frame 36. The exemplary system 12 may be expanded to include more IR receivers 22 to the first IR detector bank 48 extending the first bank 48 to a top 64 of the door frame 36, and a second bank 66 of IR receivers 22 extending along the top 64 of the door frame 36. The exemplary system 12 may execute the example process 300 described below, to detect the deflection of the IR light energy 30 to determine if an obstacle 68, as shown in FIG. 7, is present between the IR emitter 20 and any one of the IR receivers 22 of the first bank 48 and/or the second bank 66 when the curved window 18 is in any open position or moving from the open position to the closed position.

Figure 8:
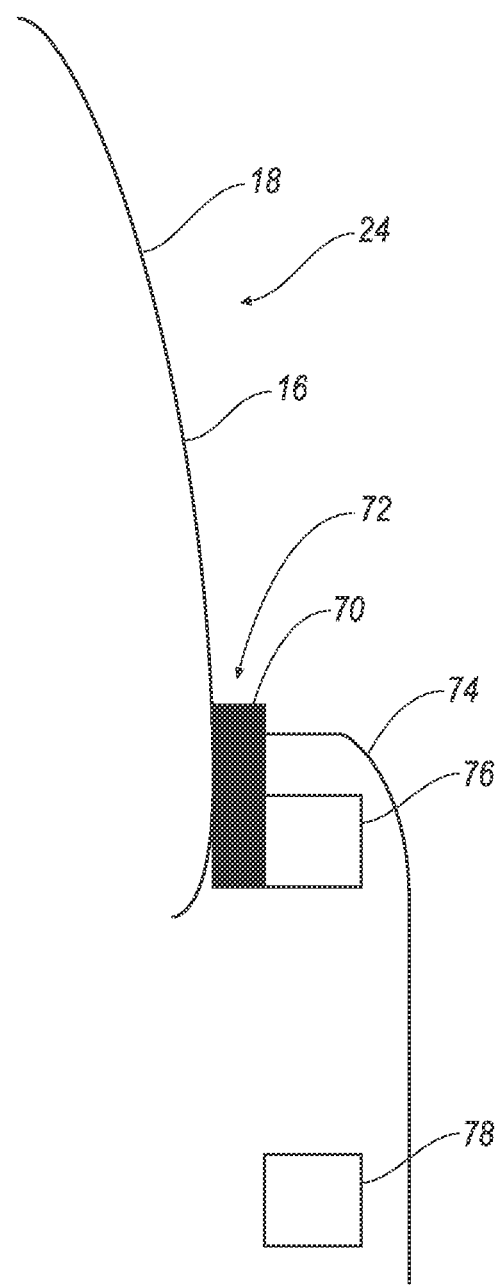
FIG. 8 is a side view of the system of FIG. 1A showing haptic feedback devices.

Referring now to FIG. 8, the exemplary system 12 may include a gasket 70. The gasket 70 may be engaged with the curved window 18 as the curved window 18 moves from the closed position to the open position. The gasket 18 seals a gap 72 between the curved window 18 and a door panel 74 of the vehicle 10. The gasket 70 may be formed of any suitable sealing material such as, e.g., natural rubber, synthetic rubber, etc.

A means for providing haptic feedback when the touchpad 14 is touched may be provided by an actuator 76. The exemplary system 12 may include the actuator 76. The actuator 76 may be fixed to the gasket 70, and the gasket 70 may be sandwiched between the curved window 18 and the actuator 76, as shown in FIG. 8. The actuator 76 may include any number of electrical components configured for receiving the touch indicator signal output from the processor 100, e.g., in the example process 300 described below. The actuator 76 may be configured to vibrate when receiving the difference output from the processor 100. The vibration may be significant enough to mechanically couple to the curved window 18 via the gasket 70 and vibrate the touchpad 14. The actuator 76 may be, for example, a linear resonant actuator (LRA), a piezo electric actuator, vibrating solenoid, etc. The actuator 76 may be fixed to the gasket by, e.g., fasteners, adhesive, etc. The actuator 76 may be in communication with the processor 100 over a communication link, such as a Controller Area Network (CAN) bus, Ethernet, or the like to receive the touch indicator signal.

A means for providing audio feedback when the touchpad 14 is touched may be provided by a speaker 78 of the vehicle 10. The exemplary system 12 may include the speaker 78. The speaker 78 may be mounted in any suitable location in the vehicle 10, e.g., the speaker 78 may be mounted in the door panel 74, as shown in FIG. 8. The speaker 78 may include any number of electrical components configured for receiving the touch indicator signal output from the processor 100, e.g., in the example process 300 described below. Upon receiving the touch indicator signal, the speaker 78 may audibly vibrate. The audio vibration may be significant enough to be heard by a human ear outside the vehicle 10. The speaker 78 may be in communication with the processor 100 over a communication link, such as a Controller Area Network (CAN) bus, Ethernet, or the like to receive the touch indicator signal.

The stored reference value, as set forth above, may be a predetermined value, e.g., IR light energy value, electrical energy value, etc., which may depend on the distance between the IR emitter and IR receiver and the unobstructed IR light energy 30 received by the IR receiver 22 when no object 34 is present between the IR emitter 20 and the IR receiver 22. There may be different entries for unobstructed IR light energy 30 that is modulated and unmodulated. There may be different entries that take into account the influence of environmental elements 44. For example, a stored reference value may correspond to the unobstructed IR light energy value received by the IR receiver 22 when an allowable amount of environmental elements 44 are blocking some of the IR light energy 30. The allowable amount of environmental elements 44 may be the amount tolerated by the exemplary system 12.

Process Flow

Figure 6:
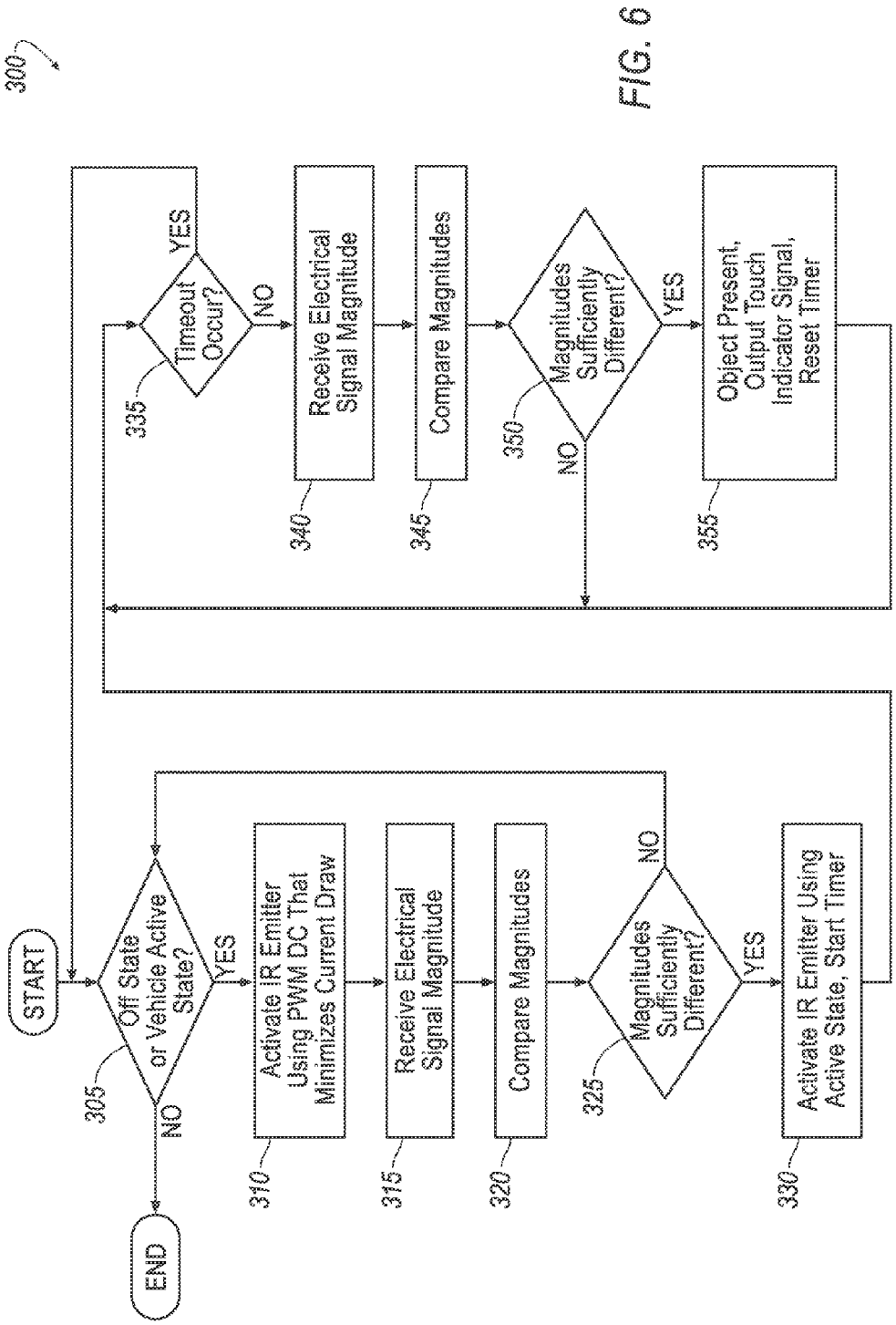
FIG. 6 is a flowchart of an example process that may be executed by the system of FIG. 1A.

FIG. 6 is a flowchart of an example process 300 for detecting a deflection of IR light energy 30, which may be executed by the processor 100 to determine whether the touchpad 14 has been touched, e.g., a location associated with a key of a virtual keypad or the like has been touched. The process 300 starts in a decision block 305.

In the decision block 305, the processor 100 determines whether the vehicle 10 is in an off state, e.g., ignition switch in the off position, engine not running, etc., or the vehicle active state, e.g., vehicle 10 running, doors locked and user outside of the vehicle 10. If the vehicle 10 is in the off state or the active state, the process 300 proceeds to a block 310. Otherwise, the process 300 ends.

Next, in the block 310, the IR emitter 20 is activated to transmit the IR light energy 30 using pulse width modulation. Pulse width modulation may be used to minimize exemplary system 12 current draw while the vehicle 10 is in the off state. The processor 100 may output the emitter output signal to the IR emitter 20. The emitter output signal may be pulse width modulated at a suitable frequency and duty cycle to capture the touch on the touchpad 14. For example, for a particular vehicle and window 18, the frequency and/or duty cycle may be empirically established, i.e., the exemplary system 12 may be calibrated for a particular environment in which it is used.

In a block 315, the processor 100 receives one or more respective electrical signals 58 from electrical circuits 50 corresponding to one or more respective IR receivers 22 as described above. The processor 100 may determine a magnitude 60 of each electrical signal 58, e.g., according to known techniques. The processor 100 typically stores in the memory 52 the value of the magnitude 60 for the respective IR receiver 22. The processor 100 may be programmed to process the electrical signals 58 from the respective IR receivers 22 at a frequency sufficiently high enough to capture the touch on the touchpad 14, e.g., process the electrical signals 58 from all the IR receivers 22 in 100 milliseconds so that a touch event is not missed.

Next, in a block 320, the processor 100 compares each magnitude 60, i.e., respective magnitudes 60 for each of the one or more electrical signals 58, to the stored reference value. For instance, the processor 100 may compare a magnitude 60 of an electrical signal 58, which is proportional to the received IR light energy 30, to the predetermined reference value stored in the memory 52, as described above. The stored reference value, which may be empirically determined, is determined for an unobstructed, e.g., no user's finger present, transmission of the IR light energy 30 where the distance D is greater than zero. The processor 100 may compare any number of processed magnitudes 60 with respective corresponding predetermined reference values, and may store the results in the memory 52. There may be a unique stored reference value corresponding to an unobstructed IR light energy 30 established empirically for each IR receiver 22.

Next, in a decision block 325, the processor 100 determines whether the compared values of the block 320 are different from one another by more than a predetermined difference threshold. The predetermined difference threshold indicates an IR light energy 30 indicating an obstruction, such as may be determined empirically. The predetermined difference threshold may be a second reference value stored in the memory 52. The predetermined difference threshold may be specific to each corresponding obstructed IR light energy value, i.e., for each IR emitter 20 indicated to be obstructed and IR receiver 22 paired therewith, i.e., receiving IR light energy 30 therefrom. For instance, if any of the magnitudes 60 of the electrical signals 58 and the respective predetermined stored reference values are different by more than the corresponding predetermined difference threshold, the object 34 may be present between any one of the IR receivers 22 and the IR emitter 20. If so, the process 300 proceeds to a block 330. If the values do not differ by more than the predetermined difference threshold, the process 300 proceeds to block 305.

In the block 330, the processor 100 changes from a low current draw mode, e.g., IR emitter 20 operating with pulse width modulation duty cycle that minimizes current draw, to an active state where the IR emitter 20 is either fully on, e.g., 100% duty cycle, or operated at a higher pulse width modulated duty cycle in order to accurately capture the touch on the touchpad 14. With unmodulated, i.e., 100% duty cycle, IR light energy 30 from the IR emitter 20, electrical signals 58 will have greater magnitudes 60 than with pulse width modulated IR light energy 30 for the case where the electrical signals 58 are averaged by the electrical circuits 50, thus increasing the sensitivity of detection of the touch to the touchpad 14. Alternatively, for the case where the electrical signals 58 are not averaged by the electrical circuits 50, the IR light energy 30 may be pulse width modulated at a higher duty cycle instead of turning on the IR emitter 20 fully. In this case, the higher duty cycle, e.g., greater duty cycle than the duty cycle used to minimize IR emitter current draw as described above, causes the IR emitter 20 to be on for greater periods of time, thus increasing the accuracy of detection. In other words, by increasing the time the IR emitter 20 is on during each pulse width modulated cycle, accuracy is increased with respect to capturing an IR light energy 30 deflection from, e.g., a user's finger, as well as capturing a specific location (e.g., touchpad 14 key) on the touchpad 14. The higher duty cycle may be determined empirically. In either case, the processor 100 may output the respective emitter output signal to the IR emitter 20. The processor 100 may start a timer, e.g., 10 seconds, which is the maximum amount of time the IR emitter 20 will stay in the active state if no touch on the touchpad 14 has been detected.

At a decision block 335, the processor 100 determines if no activity has occurred on the touchpad 14, i.e., no object 34 has been detected deflecting IR light energy 30, within a predetermined period of time, e.g., ten seconds, fifteen seconds, etc. If the time has been exceeded, the process 300 proceeds to the block 305. If the time has not been exceeded, the process 300 proceeds to a block 340

In the block 340, following the block 335, the processor 100 receives the electrical signal 58 from a particular IR receiver 22. The processor 100 processes the electrical signal 58 to determine the magnitude 60, e.g., in a known manner.

In a block 345, following the block 340, the processor 100 compares the magnitude 60 to the stored reference value for the particular IR receiver of the block 340. As mentioned above, the reference value may be empirically determined and can be different from the case where the IR emitter 20 is pulse width modulated with a duty cycle that minimizes the current draw. The processor 100 compares magnitude 60 of the electrical signal 58, which is proportional to the received IR light energy 30, to the reference value stored in the memory 52, to obtain a difference value. The reference value is dependent on the unobstructed IR light energy 30 between the IR emitter 20 and a particular IR receiver 22.

At a decision block 350, which follows the block 345, the processor 100 determines whether the difference value of the block 345 exceeds the predetermined difference threshold. As mentioned above, the predetermined difference threshold is determined to indicate that a receiver 22 has received an amount of IR light energy 30 such as may be determined empirically to indicate an obstruction, e.g., a touch. Note that the predetermined difference threshold may be different depending on whether the IR emitter 20 is pulse width modulated or unmodulated, and may be specific to each corresponding obstructed IR light energy value, i.e., for each obstructed IR emitter 20 and the particular IR receiver 22 paired therewith. For instance, if the magnitude 60 of the electrical signal 58 and the predetermined reference value are different by more than the predetermined difference threshold, the process 300 may proceed to a block 355 because the object 34 is indicated to be present between the particular IR receiver 22 and paired IR emitter 20. If the values do not differ by more than the predetermined difference threshold, the process 300 returns to the decision block 335.

In the block 355, the processor 100 stores a binary value, referred to as the touch indicator signal as described above, corresponding to the particular IR receiver 22 of the block 340, the binary value indicating whether a particular touchpad 14 indicia 46, e.g., a key on the touchpad 14, has been touched by a user. For example, a memory associated with the processor 100 and/or some other computer memory in the vehicle 10 could store, for each touchpad key, a magnitude 60 value of the electrical signal 58 from the receiver 22 at or below which the processor 100 is programmed to determine that the key has been touched. The processor 100 may output the binary value to, e.g., a vehicle security system, an ignition system, etc. The processor 100 may output the touch indicator signal to the haptic feedback actuator 76 and/or the audio feedback speaker 78, as set forth above. The processor 100 then resets the timer to zero and proceeds to block 335.

Note that the determination of a particular touchpad 14 indicia 46 having been touched is made according to a magnitude 60 associated with an electrical signal 58 detected by one IR receiver 22 as described in the blocks 340-355. However, implementations are possible and consistent with the exemplary system 12 in which a plurality of respective magnitudes 60 from respective IR receivers 22 are used to determine a touch to a particular indicia 46. For example, the processor 100 could be programmed to execute a loop for each possible indicia 46 of the touchpad 14. For example, assume that the touchpad 14 has 12 key indicia 46. For each indicia 46, e.g., each of the twelve keys, the processor 100 could be programmed to identify two or more respective IR receivers 22 and to identify magnitudes 60 respectively associated with each IR receiver 22. The processor 100 could further be programmed to then evaluate the magnitudes 60 from the plurality of IR receivers 22 to determine whether the touch indicator signal has a positive or negative value (e.g., "1," "touched," "0," "not touched," etc.). For example, each of the magnitudes 60 could be required to differ from respective stored reference values by more than a predetermined difference threshold.

In one implementation, a process similar to that described above with respect to FIG. 6 may be used to detect if environmental elements 44 have sufficiently blocked IR light energy 30 to the IR receiver 22. For example, the memory 52 may include stored reference values that correspond to unobstructed IR light energy values received by the IR receivers 22 when an allowable amount of environmental elements 44 are blocking some of the IR light energy 30, as described above. The stored reference values and predetermined difference thresholds may be empirically determined, and may be different from the stored reference values and predetermined difference thresholds utilized in the blocks 320, 345 and 325, 350 respectively. If excessive environmental elements 44 are present on the IR emitter 20, IR receiver 22, or the curved window 18 and following the example process 300 above, the touch indicator signal may be continually outputted by the processor 100. After a sufficient amount of time, e.g., minutes, the exemplary system 12 may notify a user. For example, in the case where the indicia 46 may be projected onto the curved window 18, as set forth above, the indicia 46 may be modified by the exemplary system 12 to inform the user to clean the IR emitter 20, IR receivers 22 or the curved window 18.

With respect to the figures, the elements shown and described may take many different forms and can include multiple and/or alternate components. The example components illustrated are not intended to be limiting. Indeed, additional or alternative components and/or implementations may be used. Further, the elements shown are not necessarily drawn to scale unless explicitly stated as such.

In general, the computing systems and/or devices described may employ any of a number of computer operating systems, including, but by no means limited to, versions and/or varieties of the Ford SYNC® application, AppLink/Smart Device Link middleware, the MICROSOFT® Automotive operating system, the Microsoft WINDOWS® operating system, the Unix operating system (e.g., the SOLARIS® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims.

What is claimed is:

1. A system comprising:
    a curved window;
    a light energy emitter arranged exterior to the curved window;
    a light energy receiver arranged exterior to the curved window and arranged to detect light energy emitted by the light energy emitter, the light energy unobstructed by the curved window between the light energy receiver and the light energy emitter; and
    the light energy passing over a touchpad provided on the curved window.

2. The system of claim 1, wherein the light energy receiver is arranged to accept the light energy as input and to output respective electrical energy.

3. The system of claim 2, further comprising an electrical circuit arranged to accept the electrical energy as input and to output an electrical signal that has a magnitude proportional to the light energy.

4. The system of claim 3, further comprising a processor having a memory, wherein the processor is programmed to receive the magnitude of the electrical signal and compare the magnitude to a respective predetermined value and output a touch indicator signal based on a difference between the magnitude and the respective predetermined value.

5. The system of claim 4, further comprising an actuator coupled to the curved window, wherein the processor is programmed to output the touch indicator signal to the actuator.

6. The system of claim 4, further comprising a speaker, wherein the processor is programmed to output the touch indicator signal to the speaker.

7. A system comprising:
    a curved window;
    a touchpad provided on the curved window;
    a light energy emitter arranged exterior to the curved window;
    a light energy receiver arranged exterior to the curved window and arranged to detect light energy emitted by the light energy emitter, the light energy unobstructed by the curved window between the light energy receiver and the light energy emitter; and
    the light energy emitter and receiver each positioned respectively at a first side and a second side of the touchpad.

8. The system of claim 7, wherein the receiver is arranged to accept the light energy as input and to output respective electrical energy.

9. The system of claim 8, further comprising an electrical circuit arranged to accept the electrical energy as input and to output an electrical signal that has a magnitude proportional to the light energy.

10. The system of claim 9, further comprising a processor having a memory, wherein the processor is programmed to receive the magnitude of the electrical signal and compare the magnitude to a respective predetermined value and output a touch indicator signal based on a difference between the magnitude and the respective predetermined value.

11. The system of claim 10, further comprising an actuator coupled to the curved window, wherein the processor is programmed to output the touch indicator signal to the actuator.

12. The system of claim 10, further comprising a speaker, wherein the processor is programmed to output the touch indicator signal to the speaker.

13. A system comprising:
    a curved window;
    means for emitting light energy;
    means for detecting light energy, the light energy emitting means and the light energy detecting means each arranged exterior to the curved window, the light energy unobstructed by the curved window between the light energy detecting means and the light energy emitting means;
    means for providing a touchpad on the curved window; and
    means for detecting a deflection of the light energy.

14. The system of claim 13, further comprising a window frame defining an opening receiving the curved window, the curved window being moveable along the opening from a closed position to an open position.

15. The system of claim 14, further comprising means for detecting the deflection of the light energy when an obstacle moves into the opening as the curved window is moving from the open position to the closed position.

16. The system of claim 14, further comprising means for detecting the deflection of the light energy when an obstacle moves into the opening.

17. The system of claim 13, further comprising means for providing haptic feedback on the curved window when the touchpad is touched.

18. The system of claim 13, further comprising means for providing audio feedback when the touchpad is touched.

* * * * *